United States Patent [19]

Bermond et al.

[11] Patent Number: 4,697,936
[45] Date of Patent: Oct. 6, 1987

[54] BEARING WITH REINFORCED AND VENTED SEAL

[75] Inventors: Gabriele Bermond, Pinerolo; Angelo Vignotto, Turin, both of Italy

[73] Assignee: RIV-SKF Officine Di Villar Perosa S.p.A., Italy

[21] Appl. No.: 850,858

[22] Filed: Apr. 11, 1986

[30] Foreign Application Priority Data

Apr. 23, 1985 [IT] Italy .............................. 53298/85[U]

[51] Int. Cl.⁴ ........................... F16C 33/78; F16J 9/00
[52] U.S. Cl. ..................................... 384/484; 277/29; 277/50; 277/94
[58] Field of Search ............... 384/130, 139, 140, 147, 384/151, 153, 477, 482, 484–486, 481, 607; 277/29, 35, 50, 207 R, 94

[56] References Cited

U.S. PATENT DOCUMENTS

| | | | |
|---|---|---|---|
| 2,755,113 | 7/1956 | Baumheckel | 277/94 |
| 2,830,832 | 4/1958 | Moorman et al. | 384/484 X |
| 3,049,355 | 8/1962 | Vernon | 277/94 |
| 3,114,559 | 12/1963 | Miglietti et al. | 384/485 X |
| 3,114,560 | 12/1963 | Dunn | 277/94 |
| 3,400,989 | 9/1968 | Dixon et al. | 277/94 X |
| 4,448,461 | 5/1984 | Otto | 384/482 |

Primary Examiner—Stuart S. Levy
Assistant Examiner—David Werner
Attorney, Agent, or Firm—Steele, Gould & Fried

[57] ABSTRACT

A rolling bearing has a pair of sealing rings, each of which presents at least one radial lip designed to rest and slide on a corresponding surface of the bearing inner ring and is inserted in an annular groove formed on the bearing outer ring, the aforementioned groove presenting, on the side facing the row of rolling bodies, a first tapered shoulder surface for the sealing ring and, on the opposite side, a second shoulder surface for the ring itself; each of the aforementioned sealing rings being made of deformable material and having a metal annular strengthening member and a layer of the aforementioned material arranged over the strengthening member, on the side facing the first shoulder surface, and designed to rest on the first shoulder surface.

8 Claims, 4 Drawing Figures

BEARING WITH REINFORCED AND VENTED SEAL

BACKGROUND OF THE INVENTION

The present invention relates to a sealed rolling bearing comprising an inner and an outer ring, between which is inserted a row of rolling bodies, and a pair of sealing rings, each of which presents at least one radial lip designed to rest and slide on a corresponding surface of the inner ring and is inserted in an annular groove formed on the outer ring.

The said annular groove presents a pair of shoulder surfaces, of which the first is located on the side facing the row of rolling bodies and the second on the opposite side. The first said surface is tapered and presents a smaller inside diameter than the other said shoulder surface. It has been shown that, to enable fast, low-cost production of the said second shoulder surface, it must be tapered, and that suitable conical surfaces for this purpose are those on which the generating lines form an angle ranging from 5° to 9° in relation to a plane perpendicular to the bearing ring axis.

A shoulder surface of this shape, however, is not altogether suitable for ensuring correct shouldering of the sealing ring. In fact, it has been found that, owing to the deformable nature of the ring itself, the ring may, during operation, be deformed in such a way as to assume a tapered configuration, thus affecting pressure distribution between the lips on the sealing ring and the corresponding supporting surface on the bearing inner ring. Such deformation of the ring may therefore have a negative effect on its sealing performance, particularly in cases where the ring is provided with a pair of annular lips with a labyrinth in between them. In fact, such deformation may result in one of the lips coming away from the corresponding supporting surface, and a considerable alteration in the size of the labyrinth between the lips themselves.

SUMMARY OF THE INVENTION

The aim of the present invention is to provide a sealed rolling bearing of the aforementioned type, designed to overcome the aforementioned drawback.

With this aim in view, according to the present invention, there is provided a sealed rolling bearing comprising an inner and an outer ring, between which is inserted a row of rolling bodies, and a pair of sealing rings, each of which presents at least one radial lip designed to rest and slide on a corresponding surface of the said inner ring and is inserted in an annular groove formed on the said outer ring, the said groove presenting, on the side facing the said row of rolling bodies, a first tapered shoulder surface for the said sealing ring and, on the opposite side, a second shoulder surface for the ring itself, each said sealing ring being made of deformable material and comprising a metal annular strengthening member and a first layer of the said material arranged over the said member, on the side facing outwards of the bearing, and designed to rest on the said second shoulder surface, characterised by the fact that it comprises a second layer of the said material arranged over the said strengthening member on the opposite side to that on which is arranged the said first layer, the said second layer being defined by a tapered surface designed to rest on the said first shoulder surface; passages for the said material being formed on the said strengthening member in such a manner as to connect the said first and the said second layer by means of the material filling the passages, and the outside diameters of the said first and the said second layer being equal to the outside diameter of the said strengthening member.

BRIEF DESCRIPTION OF THE DRAWINGS

The present invention will be described by way of example with reference to the accompanying drawings in which.

DETAILED DESCRIPTION OF THE INVENTION

Figure 1:
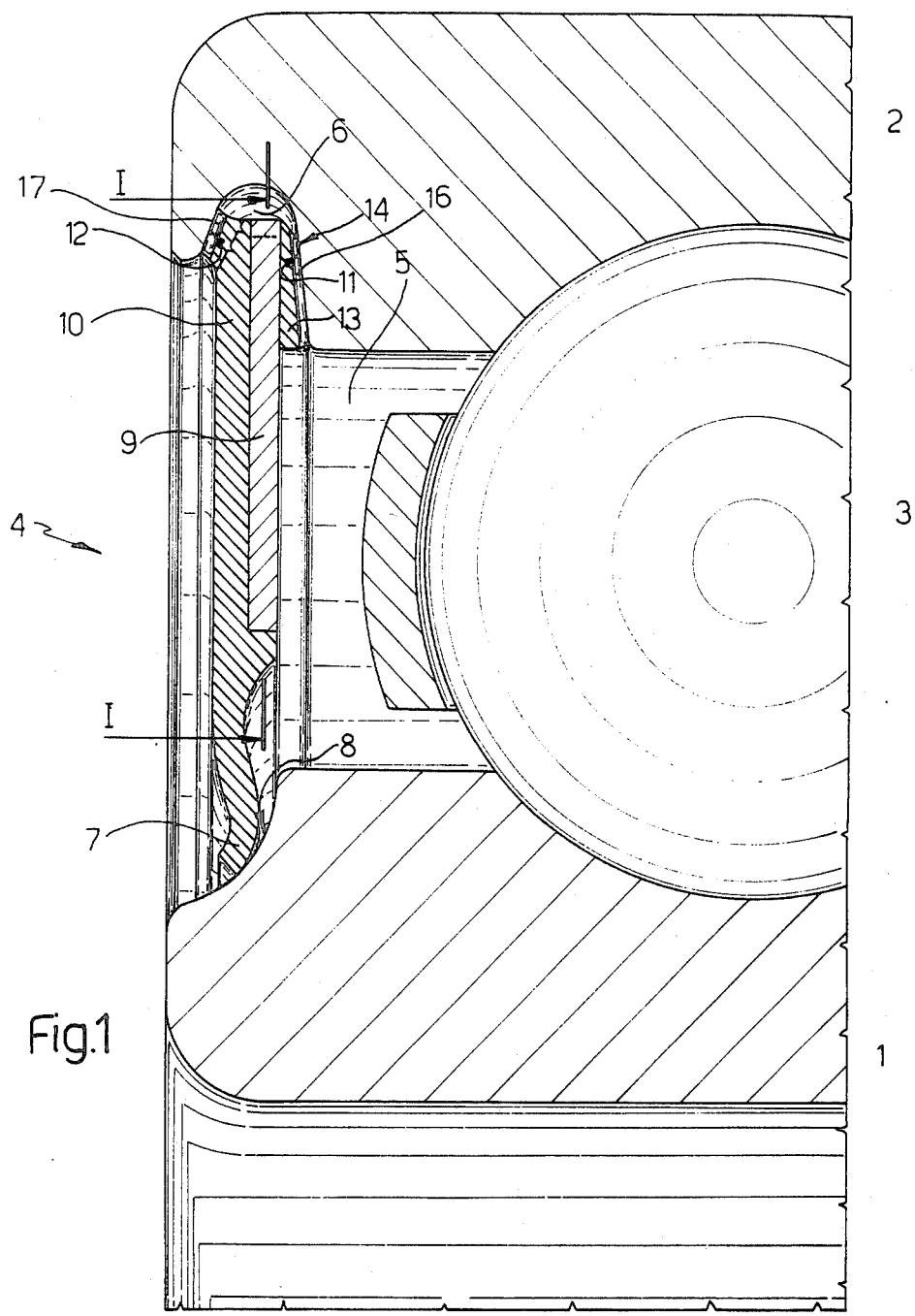
FIG. 1 shows a partial axial section of the bearing according to the present invention.

The bearing according to the present invention substantially comprises an inner ring 1 and an outer ring 2, between which is inserted a row of rolling bodies, e.g. balls 3, and a pair of sealing rings 4 for laterally closing the annular gap 5 between the said bearing rings.

Each sealing ring, which is made of appropriate deformable material, e.g. rubber, elastomer or similar, is arranged inside an annular groove 6 on bearing outer ring 2, and presents at least one deformable radial lip 7 designed to rest and slide on an appropriately-shaped corresponding surface 8 formed on inner ring 1.

Sealing ring 4 comprises a strengthening member 9, usually made of metal, over which is arranged a layer 10 of the material of which the ring itself is made. Annular groove 6 presents a pair of shoulder surfaces for axially locking sealing ring 4. Of the said shoulder surfaces, a first, numbered 11, is substantially tapered, whereas the second, numbered 12, may be of any shape, though in this case it also is conveniently tapered. The shape of the first shoulder surface 11 is imposed by technological requirements whereby the generating lines on shoulder surface 11 must present an angle ranging from 5° to 9° in relation to a plane perpendicular to the ring axis. Furthermore, as clearly shown in FIG. 1, the inside diameter of first shoulder surface 11 is considerably smaller than that of second shoulder surface 12. Finally, the outside diameter of layer 10 on sealing ring 4 substantially coincides with the outside diameter of strengthening member 9 with which the said ring is provided.

In accordance with the present invention, sealing ring 4 comprises a second layer 13 of the same material as the sealing ring itself and arranged on the opposite side of strengthening member 9 in relation to layer 10. The said second layer is defined by a substantially tapered surface 14 designed to rest on the corresponding shoulder surface 11 of groove 6. The inside and outside diameters of the said second layer 13 are respectively equal to the outside diameter of strengthening member 9 and the inside diameter of shoulder surface 11.

Figure 4:
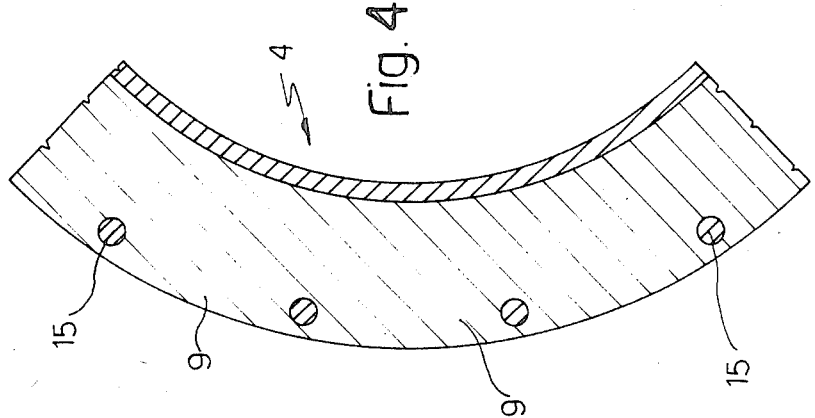
FIGS. 2, 3 and 4 show partial sections of various embodiments of the FIG. 1 bearing along line I—I in FIG. 1.
Figure 3:
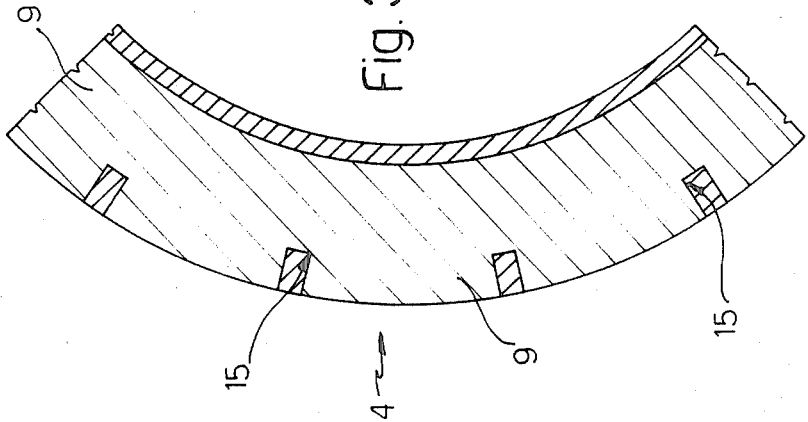
Figure 2:
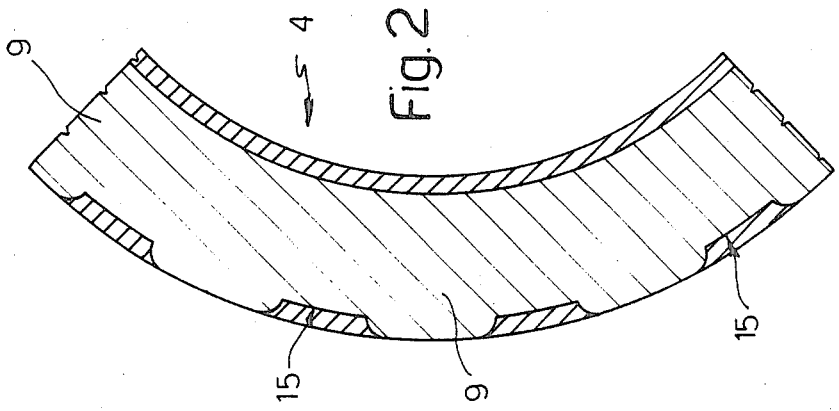

As shown in FIGS. 2 to 4, passages 15 are formed in strengthening member 9 for enabling connection of first and second layers 10 and 13 by means of the material filling the passages themselves. The said passages may be formed in any appropriate manner, e.g. by means of slots, as shown in FIGS. 2 and 3, or holes, as shown in FIG. 4. The slots are conveniently formed on the outer edge of strengthening member 9.

In accordance with the present invention, second layer 13 is provided with slots 16 located substantially in meridan planes on the sealing ring and designed to connect gap 5 between the bearing rings with annular groove 6. Further slots 17, also located in meridian planes, are formed in layer 10 for enabling communication of the said groove 6 with the outside atmosphere. The meridian planes containing slots 16 in layer 13 form prearranged angles with the meridian planes containing slots 17 in layer 10, so as to create, between gap 5 and the outside atmosphere, a route having a high resistance to passage and comprising, in addition to the said slots 16 and 17, a circumferential portion of annular groove 6.

As shown clearly in FIG. 1, layer 10 is conveniently provided with an annular projection on which are formed slots 17.

The bearing as described above operates as follows.

Each sealing ring 4 is mounted on the bearing by inserting its peripherally-outermost portion inside groove 6 on ring 2, in such a manner as to rest surface 14 of layer 13 on the first shoulder surface 11, and the projection of layer 10 on the second shoulder surface 12, as shown in FIG. 1. When so arranged, the mid plane of sealing ring 4 is strictly perpendicular to the bearing axis, by virtue of the connection between tapered surfaces 14 and 11. And such a configuration is maintained throughout the life of the bearing by virtue of the extensive contact area between the said connected surfaces and the substantially uniform pressures exchanged between them.

During operation of the bearing, the sealing rings provide for efficient sealing by virtue of correct contact between lip 7 and corresponding supporting surface 8. In the event of increased pressure inside annular gap 5, due to heating of the lubricant contained inside it, such pressure is relieved immediately by air being blown out through slots 16, groove 6 and slots 17. The said passages, in fact, form a labyrinth, the resistance to passage of which is low enough to enable easy outflow of air, but high enough for preventing external foreign substances from infiltrating inside gap 5. The resistance to passage of the labyrinth is particularly high by virtue of slots 16 and 17 being located in meridian planes forming a prearranged angle, so that the route enabling communication between the outside atmosphere and gap 5 also comprises circumferential portions of groove 6 between slots 16 and 17 themselves.

To those skilled in the art it will be clear that changes may be made to the bearing as described herein without, however, departing from the scope of the present invention.

We claim:
1. A sealed roller bearing comprising:
an inner ring and an outer ring;
a row of rolling bodies inserted between the inner ring and the outer ring; and,
a seal including a pair of sealing rings, the sealing rings presenting at least one radial lip designed to rest and slide on a corresponding surface of the inner ring and being inserted into an annular groove formed on the outer ring, the groove on the outer ring presenting, on a side of the groove facing the row of rolling bodies, a first tapered shoulder surface for one of the pair of sealing rings and, on an opposite side thereof, a second shoulder surface for the other of the pair of sealing rings, each said sealing ring being made of deformable material and the seal having a metal annular strengthening member and a first layer of the deformable material arranged over the strengthening member, on a side facing outwards of the bearing, and being designed to rest on the second shoulder surface, the seal having a second layer of the deformable material arranged over the strengthening member on an opposite side to that on which is arranged the first layer, the second layer being defined by a tapered surface designed to rest on the first shoulder surface, passages for the deformable material being formed on the strengthening member in such a manner as to connect the first layer and the second layer by means of the deformable material filling the passages, and outside diameters of the first layer and the second layer being equal to an outside diameter of the strengthening member, the first and second layers being provided with slots substantially located in meridian planes on the sealing ring and being designed to connect a gap between the bearing rings with the annular groove on the outer ring, and to connect the annular groove with an outside atmosphere, the meridian planes containing the slots on the first layer forming prearranged angles with respect to the meridian planes containing the slots on the second layer, whereby a route is formed from said gap to the outside atmosphere having a high resistance to passage.

2. A bearing as claimed in claim 1, wherein the passages are defined in part by sots formed on an edge of the strengthening member.

3. A bearing as claimed in claim 1, wherein the passages are defined in part by holes formed in the strengthening member.

4. A bearing as claimed in claim 1, wherein the first layer as an annular projection and the passages are defined in part by slots formed on the annular projection.

5. A sealed roller bearing, comprising:
an inner ring and an outer ring;
a row of rolling bodies inserted between the inner ring and the outer ring; and,
a seal including a pair of sealing rings, the sealing rings presenting at least one radial lip designed to rest and slide on a corresponding surface of the inner ring and being inserted into an annular groove formed on the outer ring, the groove on the outer ring presenting, on a side of the groove facing the row of rolling bodies, a first tapered shoulder surface for one of the pair of sealing rings and, on an opposite side thereof, a second shoulder surface for the other of the pair of sealing rings, each said sealing ring being made of deformable material and the seal having a metal annular strengthening member and a first layer of the deformable material arranged over the strengthening member, on a side facing outwards of the bearing, and being designed to rest on the second shoulder surface, the seal having a second layer of the deformable material arranged over the strengthening member on an opposite side to that on which is arranged the first layer, the second layer being defined by a tapered surface designed to rest on the first shoulder surface, passages for the deformable material being formed on the strengthening member to thereby connect the first layer and the second layer by means of the deformable material filling the passages, and outside diameters of the first layer and the second layer being equal to an outside diameter of the strengthening member, an inside diameter of the first shoulder surface being smaller than an inside diameter of the second shoulder surface, and the inside diameter of the second layer being equal to the inside diameter of the first shoulder surface.

6. A bearing as claimed in claim 5, wherein the passages are defined in part by slots formed on an edge of the strengthening member.

7. A bearing as claimed in claim 5, wherein the passages are defined in part by holes formed in the strengthening member.

8. A bearing as defined in claim 5, wherein the first layer has an annular projection and the passages are defined in part by slots formed on the annular projection.

* * * * *